(12) United States Patent
Cheeniyil et al.

(10) Patent No.: US 8,245,281 B2
(45) Date of Patent: Aug. 14, 2012

(54) METHOD AND APPARATUS FOR POLICY-BASED NETWORK ACCESS CONTROL WITH ARBITRARY NETWORK ACCESS CONTROL FRAMEWORKS

(75) Inventors: Santhosh Cheeniyil, San Jose, CA (US); Krishna Prabhakar, Los Altos Hills, CA (US); Michael Fine, San Francisco, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 1134 days.

(21) Appl. No.: 11/966,837

(22) Filed: Dec. 28, 2007

(65) Prior Publication Data

US 2008/0163340 A1 Jul. 3, 2008

Related U.S. Application Data

(60) Provisional application No. 60/882,848, filed on Dec. 29, 2006.

(51) Int. Cl.
*G06F 21/00* (2006.01)

(52) U.S. Cl. ............ 726/3; 709/201; 709/227; 705/7; 455/515

(58) Field of Classification Search .......... 726/3
See application file for complete search history.

(56) References Cited

U.S. PATENT DOCUMENTS

| | | | |
|---|---|---|---|
| 7,171,415 B2* | 1/2007 | Kan et al. .................. | 1/1 |
| 7,372,843 B1* | 5/2008 | Asawa et al. ............. | 370/349 |
| 7,418,481 B2* | 8/2008 | Fredriksson ............ | 709/217 |
| 7,610,330 B1* | 10/2009 | Quinn et al. ............ | 709/201 |
| 7,716,492 B1* | 5/2010 | Saulpaugh et al. ....... | 713/185 |
| 7,802,007 B2* | 9/2010 | Reese ..................... | 709/232 |
| 7,853,961 B2* | 12/2010 | Nori et al. ............... | 719/328 |
| 2003/0158839 A1* | 8/2003 | Faybishenko et al. ..... | 707/3 |
| 2005/0111466 A1 | 5/2005 | Kappes et al. | |
| 2005/0177865 A1* | 8/2005 | Ng et al. ................. | 726/3 |
| 2006/0015353 A1* | 1/2006 | Reese .................... | 705/1 |
| 2006/0036733 A1 | 2/2006 | Fujimoto et al. | |
| 2006/0123467 A1* | 6/2006 | Kumar et al. ............ | 726/3 |
| 2008/0005359 A1* | 1/2008 | Khosravi et al. .......... | 709/250 |
| 2009/0150400 A1* | 6/2009 | Abu-Hakima et al. ..... | 707/10 |

OTHER PUBLICATIONS

Privacy-enhancing Access Control Mechanism in Distributed Online Social Network|http://www.peerson.net/papers/xacmlThesisRobayetNasim.pdf|Robayet Nasim|2010.*

* cited by examiner

*Primary Examiner* — Taghi Arani
*Assistant Examiner* — Mahfuzur Rahman
(74) *Attorney, Agent, or Firm* — Blakely, Sokoloff, Taylor & Zafman LLP

(57) ABSTRACT

A method and apparatus for integrating various network access control frameworks under the control of a single policy decision point (PDP). The apparatus supports pluggable protocol terminators to interface to any number of access protocols or backend support services. The apparatus contains Trust and Identity Mediators to mediate between the protocol terminators and a canonical policy subsystem, translating attributes between framework representations, and a canonical representation using extensible data-driven dictionaries.

22 Claims, 4 Drawing Sheets

METHOD AND APPARATUS FOR POLICY-BASED NETWORK ACCESS CONTROL WITH ARBITRARY NETWORK ACCESS CONTROL FRAMEWORKS

CROSS-REFERENCE TO RELATED APPLICATION

This application claims priority from U.S. Provisional Patent Application Ser. No. 60/882,848 entitled "A Method and Apparatus for Policy-Based Network Access Control with Arbitrary Network Access Control Frameworks," filed Dec. 29, 2006 which is hereby incorporated by reference in its entirety.

TECHNICAL FIELD

The present invention relates to the field of network communication. More specifically, the present invention relates to control of access to network and system resources by users and devices in a multiple network access control framework environment.

BACKGROUND

Historically, controlling access to communication network resources has been accomplished by physical security techniques. In particular, a user would require physical access to the network, such as by being physically in a building, in order to obtain access to the network. A general assumption in this scenario is that access to the building entitled the user access to the network communication resources.

With the growth and now prevalence of wireless network access, the general assumption of physical access has been undone since it is impractical to limit radio waves to physical building boundaries. As a result, various software authentication techniques and protocols have been developed which require users or network devices to identify themselves to the network prior to being granted access to the network.

Simultaneously, requirements and conditions for granting network access have also become more complex. In some instances, network access may be location or time dependant. In other instances, network access may depend on a state of the device joining the network. The state may include factors such as a software version of the device, timely anti-virus checks, or firewall configuration. The state is frequently simply referred to as the health or posture of the device.

As a result of these and other requirements, network access control (NAC) has become a complex multi-faceted problem involving a multiplicity of cooperating components operating within a well-defined network access control framework. The cooperating components potentially include client software to assist in identification of the user and gathering of client device state, network access devices (NADs) which assist in the enforcement of access control decisions, and a policy decision point (PDP). The PDP is where a network operator specifies access control policies and where an access control decision is made. In addition, NAC frameworks generally also include various servers to assist the PDP such as audit servers to audit devices that do not have the necessary client software, or specialized health or posture validation servers (PVSs).

Several such frameworks have been proposed and are in early stages of deployment. Three such frameworks in particular are being actively adopted in the industry. The three frameworks are Cisco's Network Access Control (CNAC), Microsoft's Network Access Protection (NAP), and the Trusted Computing Group's Trusted Network Connect (TNC).

Each of these frameworks has its strengths and weaknesses such as varying degrees of client support (e.g., Windows XP® versus Linux® versus Vista®), access support (e.g., VPN versus 802.1x versus EAPoUDP), and enforcement support (e.g., VLANs versus downloadable ACLs versus filters). As a result, network operators are likely to deploy more than one framework in each of their respective networks. While similar, these frameworks do have significant differences that are problematic in a multi-framework deployment scenario.

Current state-of-the-art strategies in this nascent area dictate two deployment scenarios that can be adopted by an organization that require multiple NAC frameworks to meet their disparate assessment and operating requirements. In one scenario, the network access can be segmented in such a way that some assessments are done by one framework and others are done by a second framework. In another scenario, the PDP of one framework handles all assessment requests, but forwards or proxies assessments that it cannot handle to a PDP of another framework. One problem with either of these approaches is that the administrator has to manage policies on several PDPs, each one different from the other. Another problem is the complex, and perhaps subtle, interactions between the frameworks leading to inconsistent, or worse, incorrect results. Even in a seemingly unified deployment where assessments that cannot be handled by one PDP are forwarded to a PDP belonging to another framework, policy configurations can be conflicting, thus leading to incorrect enforcement of the NADs.

Therefore, what is needed is a solution that unifies multiple frameworks and coordinates their actions so that a correct end result is achieved. Such a unifying solution should meet the following requirements:

The solution should present a unified configuration interface so an administrator can configure all policies without regard to a specific framework;

The solution should seamlessly handle different types of clients, access types, enforcement mechanisms and underlying protocols, and application programming interfaces; and The solution should be extensible so that it can embrace and function properly with new frameworks as the frameworks are developed and deployed.

Problems with multi-framework deployments can also manifest themselves in single-framework deployments when the single framework is enhanced with new capabilities. Just as with multiple frameworks, new features and capabilities need to be integrated with existing ones and they should all be controlled together in a unified and coordinated way. It would therefore be advantageous to provide solutions to these and other related problems.

SUMMARY OF THE INVENTION

An exemplary embodiment discloses a method of granting network access to a client in a communication network. The method comprises receiving a request to access the network from the client, invoking an appropriate access protocol terminator, receiving at least one attribute about the client from the appropriate access protocol terminator, translating the at least one attribute to a canonical form, and using the at least one attribute in canonical form to determine a service type.

Another exemplary embodiment discloses a computer readable medium having embodied thereon a program, the program is executable by a machine to perform a method to grant access to a client in a communication network. The method comprises receiving a request to access the network from the client, invoking an appropriate access protocol terminator, receiving at least one attribute about the client from the appropriate access protocol terminator, translating the at least one attribute to a canonical form, and using the at least one attribute in canonical form to determine a service type.

Another exemplary embodiment discloses a system to grant network access to a client in a communication network. The system comprises a client protocol terminator configured to be coupled through a network access device to a remote client, an access attribute translation device coupled to the client protocol terminator and configured to translate attributes from a first framework representation to a canonical representation, and a policy database coupled to the access attribute translation device and configured to store protocol attributes relating to a plurality of frameworks.

Another exemplary embodiment discloses a system to grant network access to a client in a communication network. The system comprises a client protocol terminator means for coupling to a remote client, an access attribute translation means for translating attributes from a first framework representation to a canonical representation, and a protocol storage means for storing protocol attributes relating to a plurality of frameworks.

BRIEF DESCRIPTION OF THE DRAWINGS

FIG. 1 illustrates clients accessing the network via wired NADs, wireless NADs, and across the Internet via a VPN gateway. FIG. 1 further illustrates other enforcement points, a PDP, and some backend servers.

DETAILED DESCRIPTION

Described herein are various exemplary embodiments of a system with an apparatus for a PDP in an NAC framework such that the PDP can operate within specifications of multiple frameworks, integrate with components of each framework, and coordinate activities between components of all frameworks to achieve desired policy and access control decisions. Such a system is referred to as a Unified Trust and Identity Policy System (UTIPS).

Figure 1:
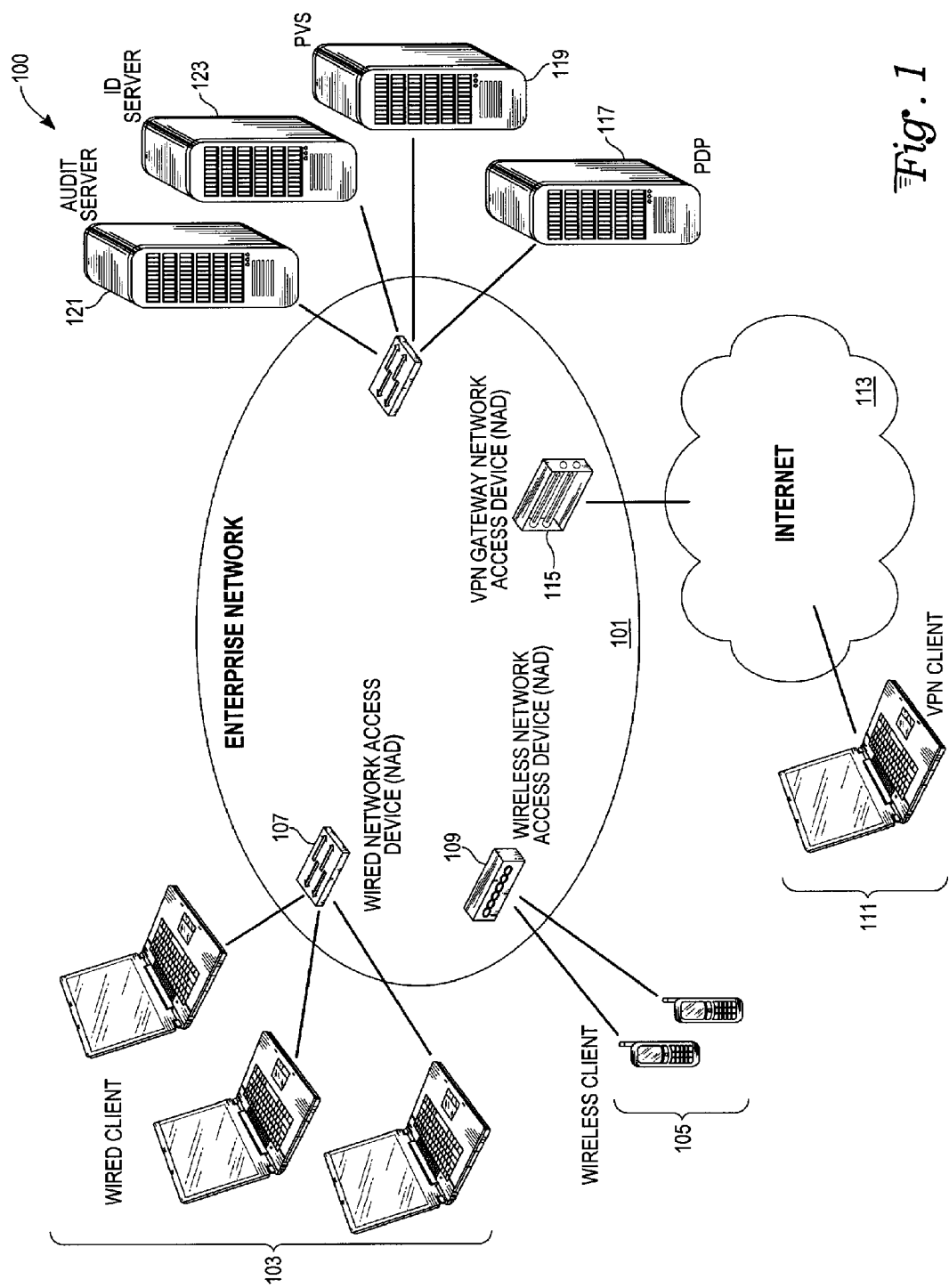
FIG. 1 is a diagram illustrating a high level overview of a network according to an exemplary embodiment.

With reference to FIG. 1, a high level system overview 100 of a network 101 includes one or more wired client devices 103 used to access the network 101 directly through a wired network access device (NAD) 107. The one or more wired client devices 103 could be, for example, notebook or desktop computers. The high level system overview 100 further includes one or more wireless client devices 105 used to access the network 101 directly through a wireless access device 109. The one or more wireless client devices 105 could be, for example, personal data assistants (PDAs) or cellular phones capable of Internet access. Each of the various wired 103 and wireless 105 client devices, plus others, are known to a skilled artisan. Each of the client devices 103, 105 attempts access to the network 101 directly through the wired 107 or wireless 109 NAD. Further, a VPN-based client device 111 may also connect to the Internet 113 and access the network 101 indirectly through a VPN gateway network access device 115.

With continued reference to the exemplary embodiment of the high level system overview 100 of the network 101 of FIG. 1, typical components of NAC frameworks further include enforcers which block client access to the network until they receive access control instructions from a PDP 117. Enforcers include the network access devices (NADs) 107, 109, 115 (which may include switches, not shown), routers at some routing boundary (not shown), and DHCP servers (not shown).

The PDP 117 orchestrates access control processes. Additionally, backend servers may assist the PDP 117 in making an access control decision. The backend servers may include one or more posture validation servers (PVSs) 119, as defined in the CNAC framework, one or more audit servers 121 as defined in the CNAC framework, and policy servers (not shown) as defined in the NAP framework. The backend servers may also include identity servers (ID servers) 123 which are used to authenticate either devices or users. Other embodiments may have different network configurations and would be readily envisioned by one of skill in the art based on the exemplary embodiment of FIG. 1.

Figure 2:
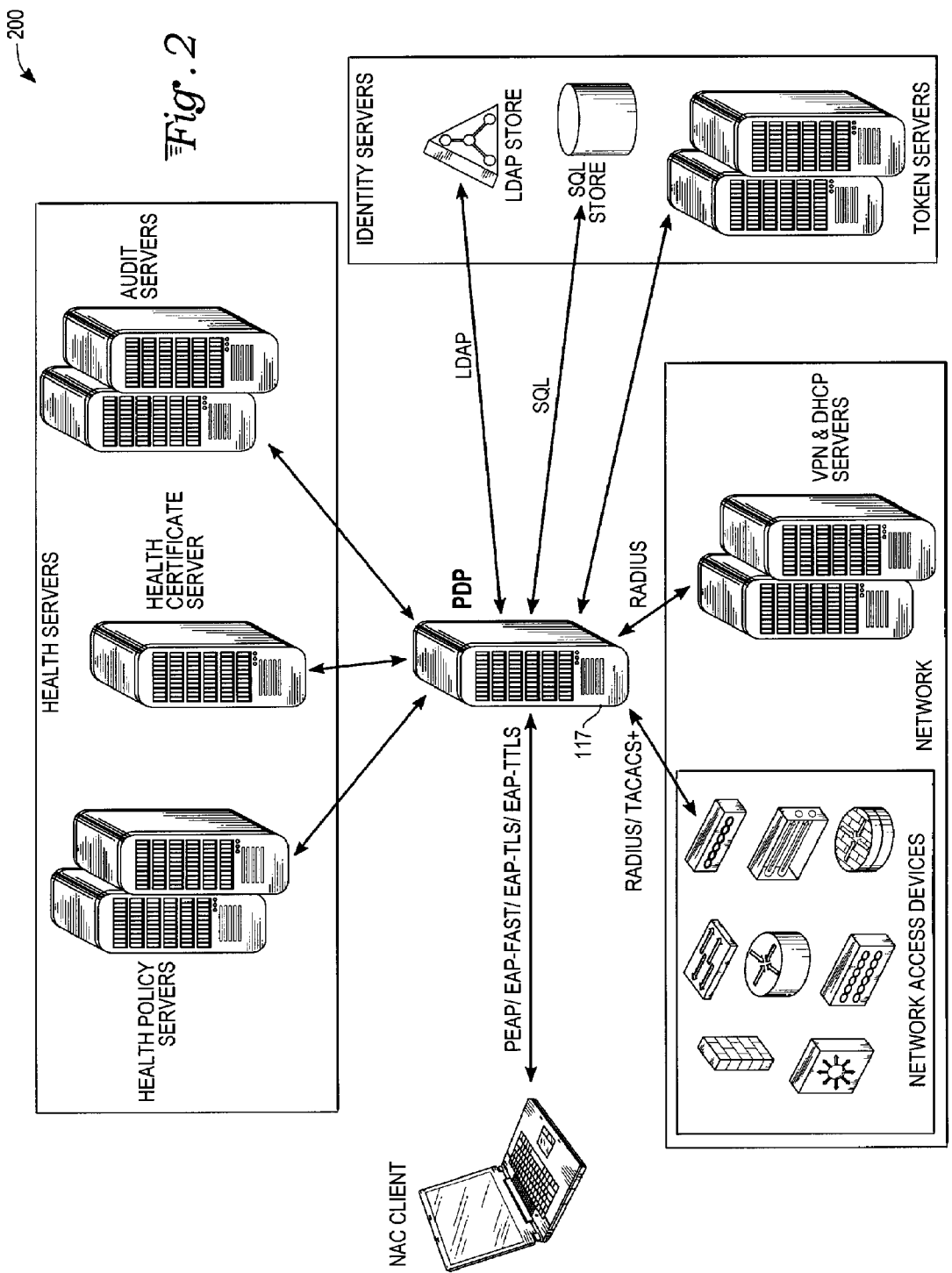
FIG. 2 shows an exemplary logical structure of an NAC framework with the single PDP at the core of the system and coordinating activities of other components.

With reference to FIG. 2, an exemplary logical structure 200 of the NAC components in the high level system overview 100 of FIG. 1 is shown. FIG. 2 indicates a central role of the PDP 117 with links to other components. The links, as shown, merely represent protocol interactions and not necessarily physical data paths.

Some of the components in the exemplary logical structure 200 have a basis in a subset of the frameworks. A benefit of the exemplary logical structure 200 is an ability to integrate functionality from one framework into a deployment comprised of another framework. In some embodiments, integration is possible with any type of component including but not limited to:

Clients such as a Linux client with CNAC support being integrated into an NAP deployment;

Enforcers such as a VPN or Dynamic Host Configuration Protocol (DHCP) enforcer from the NAP framework being integrated into a CNAC deployment;

Backend servers such as an audit server from the CNAC framework being integrated into an NAP deployment; and Enforcement policies such as downloadable Access Control Lists (ACLs) from the CNAC framework being integrated into an NAP deployment.

Figure 3:
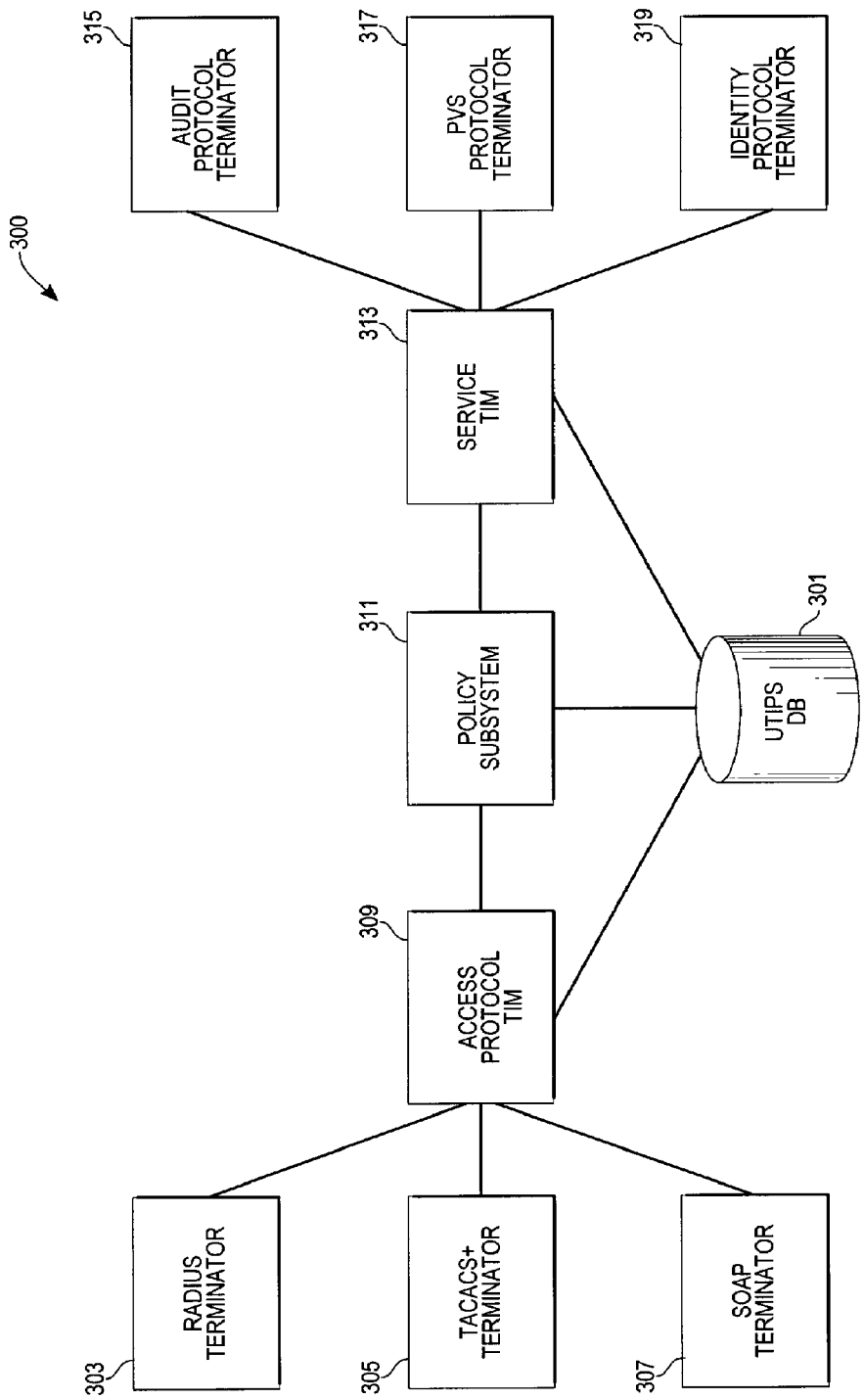
FIG. 3 shows an internal block diagram of an exemplary embodiment of a unified trust and identity policy system.

One embodiment of the exemplary logical structure 200 of FIG. 2 is shown in FIG. 3 as an exemplary version of a Unified Trust and Identity Policy System (UTIPS) 300. The UTIPS 300 comprises several components.

The UTIPS 300, in this embodiment, is a rules-based policy subsystem for making policy decisions. The subsystem hosts a rules engine that evaluates rules for different types of policies. The subsystem processes each access request by means of a multi-stage rules evaluation pipeline. Each stage is driven by one or more of the following inputs or attributes:

Rules from a rules database (in one embodiment, in a UTIPS database 301) or other type of data structure;

Attributes from an access protocol;

A plurality of NAC framework attributes;

A system clock for the time; and

Output from one or more previous stages of the pipeline.

The attribute(s) or input(s) that are fed into each stage are specified by means of extensible data dictionaries. The extensible data dictionaries allow for extensions and modifications without any software upgrades or even a system restart. The output of each stage is a result or a set of results that can be fed into subsequent stages in the pipeline.

Each stage of the pipeline corresponds to rules evaluated for a specific type of assessment performed for a given network session. In one embodiment, the different stages may include, but are not limited to: service assessment, identity assessment, health assessment, and enforcement assessment. The service assessment results in a service type being assigned to the network session. The service type helps the subsystem to determine the type of authentication, policies to evaluate in subsequent stages of the evaluation pipeline, and other backend servers to contact as needed for subsequent health and identity assessments. Identity assessment results in a role or set of roles being assigned to the user or device that initiated the network session. Health assessment results in the subsystem assigning a health status to the device that initiated the session. The enforcement assessment stage takes as an input, among other attributes, results of the identity and health assessment stages and determines the network segment or VLAN, access filters, quality of service, and other attributes to be enforced for that session on the NAD. The results may also contain provisioning instructions for the client device. As would be discernible to a skilled artisan based on the aforementioned description, different stages may be employed in other pipelines or in other arrangements in other embodiments.

Linked to a policy subsystem 311 are a collection of protocol terminators, one for each access protocol. With reference again to FIG. 3, three protocol terminators, a RADIUS terminator 303, a TACACS+ terminator 305, and a SOAP terminator 307, are shown. A protocol terminator may be common to several frameworks. For example, the RADIUS terminator 303 is common to both CNAC and NAP frameworks. However, the set of attributes belonging to each framework may differ.

Attributes of a given framework are specified in a framework attribute database (in one specific exemplary embodiment, in the UTIPS database 301) or other type of data structure. The attribute database specifies not only the attributes of a framework but also the translation of these attributes from the framework representation to a canonical representation that is used by the PDP 117 (see FIGS. 1 and 2) itself.

As attributes are passed from the protocol terminators 303, 305, 307 to the policy subsystem 311 and back, they pass through an access protocol Trust and Identity Mediator (TIM) 309 which translates attributes from one representation to another. The translation is driven off the specification in the framework attribute database for the specific framework. In addition to the framework attribute tables, there are also access protocol attribute tables. The tables are checked if there is no entry in the framework tables. This allows for specifying translations that are specific to an access protocol but common to all frameworks. Since the framework-specific information for the translation is obtained from the framework attribute database, the access TIM 309 is generic and a common one can be used for all frameworks and protocols.

The design of protocol terminators and TIMs on the client access side of the PDP 117 may also be also employed on the backend service side of the PDP 117. Thus, FIG. 3 also shows several backend service protocols linked to the policy subsystem 311 via a service TIM 313. The backend service protocols include, for example, an audit protocol terminator 315, a PVS protocol terminator 317, and an identity protocol terminator 319. The operation of the service translator is driven off service attribute translation databases, one for each backend service. As with framework attribute translation tables, there are also backend protocol translation tables which are specific to a backend protocol but common to all backend services using that protocol.

Support for a new NAC framework in UTIPS entails the following additions:
 An attribute database for the framework (and corresponding translation to canonical form);
 An access protocol terminator (if there is a new access protocol prescribed by the framework); and
 A service protocol terminator (if there are any new backend services prescribed by the framework).

Operational Flow

Figure 4:
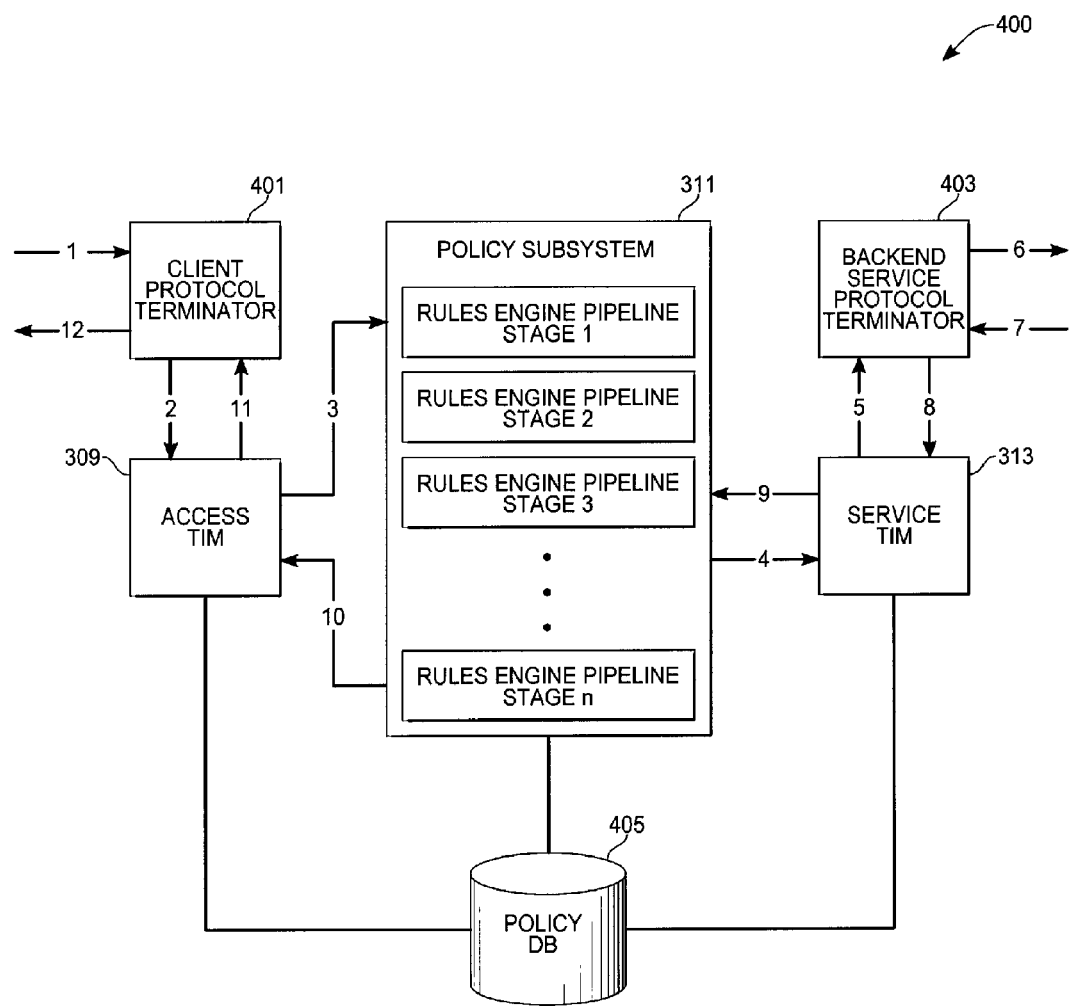
FIG. 4 represents diagrammatically an exemplary embodiment of an operational flow of the PDP in making an access control decision.

With reference to FIG. 4 and continued reference to FIGS. 1 and 3, when the client 103, 105, 111 attempts to connect to the network 101, access by the client is blocked by one of several enforcers such as the NAD 107, 109, 115, the DHCP server (not shown), or the VPN gateway (through the VPN NAD 115). The enforcer that blocks access depends on a configuration of the network 101 and the mechanism by which the client 103, 105, 111 is accessing the network 101. Once blocked, the client 103, 105, 111 communicates with the PDP 117 to negotiate access to the network 101 using a protocol defined by the NAC framework the client supports.

To perform the communication, the PDP 117 invokes an appropriate protocol terminator to run the protocol state machine as specified by the protocol. Attributes from the initial exchange are delivered from the protocol engine to the policy subsystem 311 of the PDP 117 via the access trust and identity mediator 309 which translates the attributes from a framework-specific form (such as CNAC, NAP, etc.) to an internal, canonical form. The attributes allow the policy subsystem 311 to select the service type for the remainder of the exchange. The service type specifies, for example, the authentication and authorization rules that are to be applied, such as what credentials to check for authentication, whether one or two factor authentication is necessary, what client attributes are needed for the policy decision, and so on. The service type rules are specified in a canonical form and the input variables to the rules engine are obtained from the service TIM 313 which has translated the inputs from the form specific to the framework into the canonical form required by the rules engine.

Having determined the service type, the policy subsystem 311 then informs the framework protocol engine (the protocol terminators in FIG. 3, a client protocol terminator 401 in FIG. 4) of the service type which allows the framework protocol engine to complete the authentication process and to request the additional required attributes from the client. Again, the appropriate TIM 309, 313 converts the service specification from one form to the other, in this case from the canonical form to the framework-specific form. For instance, CNAC and NAP have different packet formats for the attributes so the appropriate TIM would translate from the canonical form to a format understood by the appropriate framework.

In order to perform any conversions, be they service types or attributes, the TIM 309, 313 employs a conversion dictionary that specifies the translation. Using a dictionary makes it possible to add new service types and attributes without any software upgrades. In addition, this makes any translator function generic and not framework-specific. The framework-specific aspects are encoded in the conversion dictionaries. Consequently, new frameworks can be easily added to the system by simply adding new conversion dictionaries to the database of conversion dictionaries. Protocol terminators 401, 403, however, may need to be implemented by additional plug-ins. An exemplary embodiment implements these protocol terminators with loadable modules so that they can be added to an existing and running system.

After completing the framework protocol state machine according to the parameters of the service type, the protocol terminator 401, 403 returns the results in the form of attributes to the TIM 309, 313 which translates these attributes into canonical forms and passes them on to the policy subsystem 311. The policy subsystem 311 then applies the policy rules by running through the multi-stage rules engine pipeline as necessary, soliciting assistance from back-end servers as necessary. Once a policy result has been determined, the result is passed back to the framework protocol engine which delivers the result to the NAC enforcer (e.g., the NAD, DHCP, or VPN server). The result may contain any data, such as provisioning instructions for both the enforcer and the client, instructions allowing access, instructions denying access, etc. As with the service types, the access protocol TIM 309 converts the provisioning instructions from a canonical form to a framework-specific form by means of attribute conversion dictionaries stored in a policy database 405.

An exemplary operational flow 400 is shown in FIG. 4. The operational flow 400, in this exemplary embodiment, may be readily considered in terms of the following informational transfer of information as indicated diagrammatically in FIG. 4:

1: Access request from NAD and client.
2: Framework protocol attributes to protocol mediator.
3: Canonical attributes to policy subsystem.
4: Canonicalized request attributes to service protocol terminator.
5: Services-specific attributes to service protocol terminator.
6: Request to backend service.
7: Response from backend service.
8: Service-specific response attributes to service protocol TIM.
9: Canonicalized response attributes to policy subsystem.
10: Provisioning attributes in canonicalized form.
11: Provisioning attributes in framework protocol form.
12: Response to NAD and client.

The method of the exemplary operational flow 400 may be implemented by software, a processor-readable medium having stored thereon instructions which, when read, cause a process (or other electronic devices) to perform a process or method. The processor-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/processor-readable medium suitable for storing electronic instructions.

Moreover, the processor-readable medium may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a processor-readable medium.

In a specific exemplary embodiment, software for the implementing the method may be running at the PDP 117 or other devices as shown in FIG. 2. The PDP 117 or other devices may be any network device capable of storing the software for implementing the method.

In the foregoing specification, the present invention has been described with reference to specific embodiments thereof. It will, however, be evident to a skilled artisan that various modifications and changes can be made thereto without departing from the broader spirit and scope of the present invention as set forth in the appended claims. For example, although a method of the present invention is described primarily in reference to access to a simplified network, skilled artisans will appreciate that the present invention may also be practiced with a far more complicated network structure. For example, a network with thousands of clients and NADs and numerous authentication backend servers may use a scaling of the methods provided herein. Further, the method described in granting network access to a client may be repeated on a periodic basis rather than merely once per session. The specification and drawings are, accordingly, to be regarded in an illustrative rather than a restrictive sense.

What is claimed is:

1. A method of granting a client access to a communication network, the method comprising:
   blocking access by the client to the communication network using an enforcer;
   receiving a request to access the communication network from the client;
   invoking an appropriate access protocol terminator;
   receiving at least one attribute associated with client access to the communication network from the appropriate access protocol terminator;
   translating the at least one attribute into a canonical form;
   receiving at least one attribute of backend service type information and translating the at least one attribute of the backend service type information into the canonical form;
   using the at least one attribute associated with client access in canonical form and the at least one attribute of the backend service type information in canonical form as input to policy rules;
   applying the policy rules to determine a policy result;
   delivering the policy result to the enforcer; and
   granting access by the client to the communication network through the enforcer based on the policy result.

2. The method of claim 1 wherein the method is implemented with a plurality of clients, the plurality of clients each having one or more network access control frameworks.

3. The method of claim 1 further comprising: determining an access policy result; and delivering the access policy result to the client.

4. The method of claim 1 further comprising implementing access to the network with a single policy system and associated set of rules regardless of a number of network access control frameworks utilized.

5. The method of claim 1 further comprising making network access requests from an environment having a plurality of network access control frameworks.

6. The method of claim 1 wherein the translating the at least one attribute into the canonical form further comprises utilizing extensible data-driven dictionaries.

7. The method of claim 1 further comprising controlling an integration of various network access control frameworks with a single policy decision point.

8. A non-transitory computer readable medium having embodied thereon a program, the program being executable by a machine to perform a method to grant access to a client in a communication network, the method comprising:
   blocking access by the client to the communication network using an enforcer;

receiving a request to access the communication network from the client;
invoking an appropriate access protocol terminator;
receiving at least one attribute associated with client access to the communication network from the appropriate access protocol terminator;
translating the at least one attribute associated with client access into a canonical form;
receiving at least one attribute of service type information and translating the at least one attribute of the service type information into the canonical form;
using the at least one of the attribute associated with client access in the canonical form and the at least one attribute of service type information in canonical form as input to policy rules;
applying the policy rules to determine a policy result;
delivering the policy result to the enforcer; and
granting access by the client to the communication network through the enforcer, based on the policy result.

9. The computer readable medium of claim 8 wherein the method is implemented with a plurality of clients, the plurality of clients each having one or more network access control frameworks.

10. The computer readable medium of claim 8 wherein the method further comprises: determining an access policy result; and delivering the access policy result to the client.

11. The computer readable medium of claim 8 wherein the method further comprises implementing access to the network with a single policy system and associated set of rules regardless of a number of network access control frameworks utilized.

12. The computer readable medium of claim 8 wherein the method further comprises making network access requests from an environment having a plurality of network access control frameworks.

13. The computer readable medium of claim 8 wherein the step of translating the at least one attribute into a canonical form further comprises using extensible data-driven dictionaries.

14. The computer readable medium of claim 8 wherein the method further comprises controlling an integration of various network access control frameworks with a single policy decision point.

15. The computer readable medium of claim 8 wherein the method further comprises selecting pluggable protocol terminators to interface to a plurality of access protocols or backend support services.

16. A system to grant network access to a client in a communication network, the system comprising:
a client protocol terminator configured to be coupled through a network access device to a remote client;
an access attribute translation device coupled to the client protocol terminator and configured to translate attributes from a first framework representation into a canonical representation;
a policy database coupled to the access attribute translation device and configured to store protocol attributes relating to a plurality of frameworks;
a service protocol terminator configured to be coupled to one or more backend service services;
a service attribute translation device coupled to the policy database and the service protocol terminator, the service attribute translation device being configured to translate attributes from a second framework representation to the canonical representation; and
a policy subsystem coupled to the access attribute translation device and the policy database, configured to determine a policy result based upon an attempt by the client to connect to the communication network,
wherein the network access device blocks the client from accessing the communication network prior to the policy result being determined and the network access device grants the client access to the communication network based on the policy results.

17. The system of claim 16 further comprising the policy subsystem having a plurality of rules engine pipeline stages.

18. The system of claim 16 further comprising a single policy decision point configured to control an integration of a plurality of network access control frameworks.

19. A system to grant network access to a client in a communication network, the system comprising:
client protocol terminator means adapted for coupling to a remote client;
an enforcer;
access attribute translation means for translating attributes from a first framework representation into a canonical representation;
protocol storage means for storing protocol attributes relating to a plurality of frameworks;
service protocol terminator means adapted for coupling to one or more backend service devices;
service attribute translation means for translating attributes from a second framework representation into the canonical representation; and
policy determination means coupled to the enforcer, the access attribute translation means and the protocol storage means, for determining a policy result based upon an attempt by the client to connect to the communication network,
wherein the enforcer blocks the client from accessing the communication network prior to the policy result being determined and the enforcer grants the client access to the communication network based on the policy result.

20. The system of claim 19 wherein the policy determination means includes a policy subsystem coupled to the access attribute translation means and the protocol storage means, the policy subsystem having a plurality of rules engine pipeline stages.

21. The system of claim 19 further comprising a single policy decision means for controlling an integration of a plurality of network access control frameworks.

22. A method of granting a client access to a communication network, the method comprising:
blocking access by the client to the network using an enforcer;
receiving a request to access the network from the client;
invoking an appropriate access protocol terminator by selecting a pluggable protocol terminator to interface to a plurality of access protocols or backend support services;
receiving at least one attribute about the client from the appropriate access protocol terminator;
translating the at least one attribute into a canonical form utilizing extensible data-driven dictionaries and using the at least one attribute in canonical form as input to policy rules;
applying the policy rules to determine a policy result;
delivering the policy result to the enforcer; and
granting access by the client to the communication network through the enforcer based on the policy result.

* * * * *